Feb. 12, 1935.  G. D. BOWER  1,990,813
HEAT REGULATING APPARATUS
Filed June 7, 1929  3 Sheets-Sheet 1
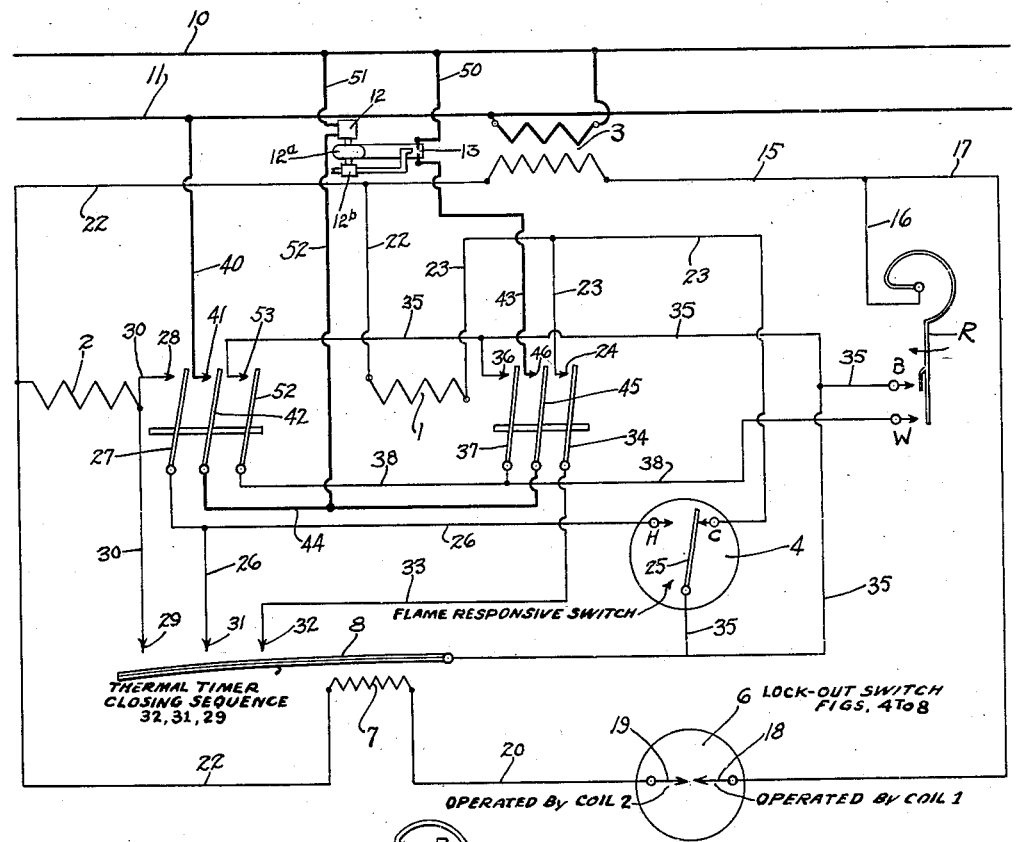
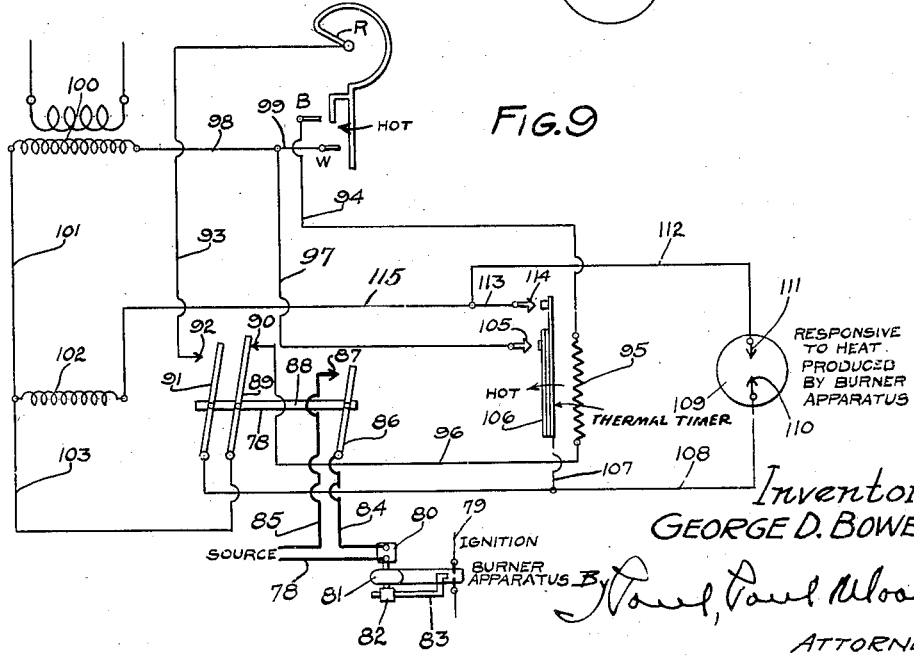
Inventor
GEORGE D. BOWER
ATTORNEYS Feb. 12, 1935.   G. D. BOWER   1,990,813
HEAT REGULATING APPARATUS
Filed June 7, 1929   3 Sheets-Sheet 2
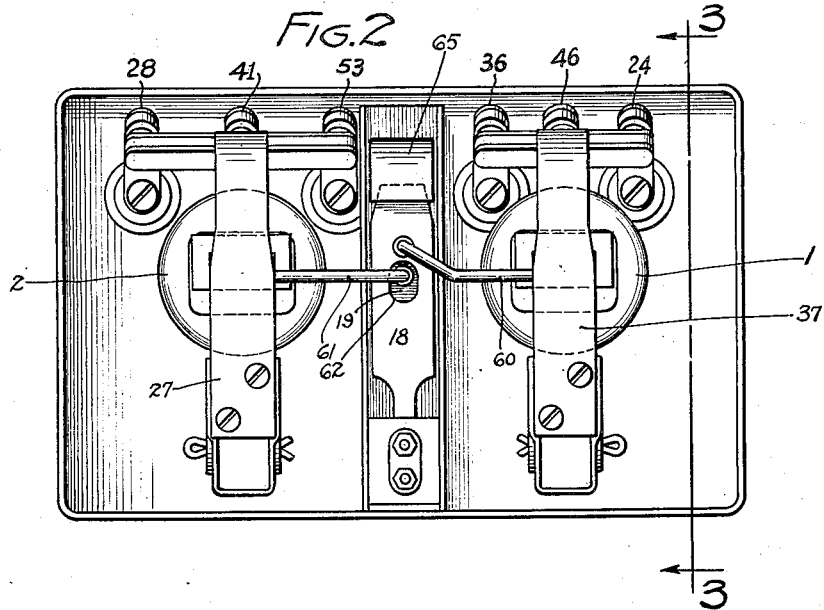
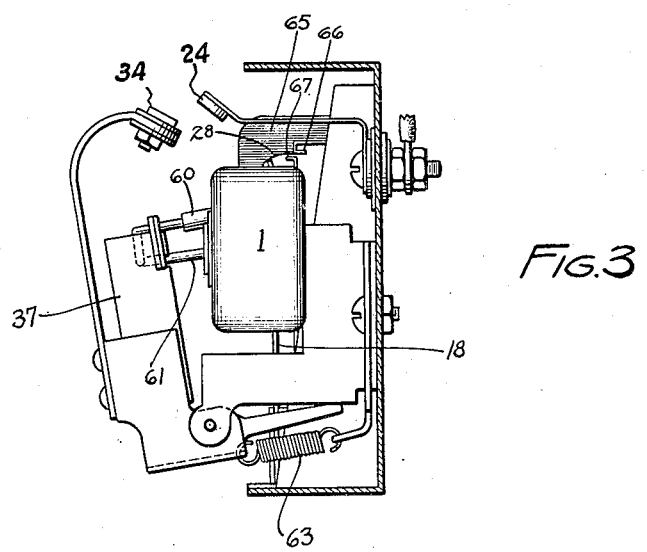
Inventor
GEORGE D. BOWER
By Paul, Paul Moore
ATTORNEYS Feb. 12, 1935.  G. D. BOWER  1,990,813
HEAT REGULATING APPARATUS
Filed June 7, 1929   3 Sheets-Sheet 3
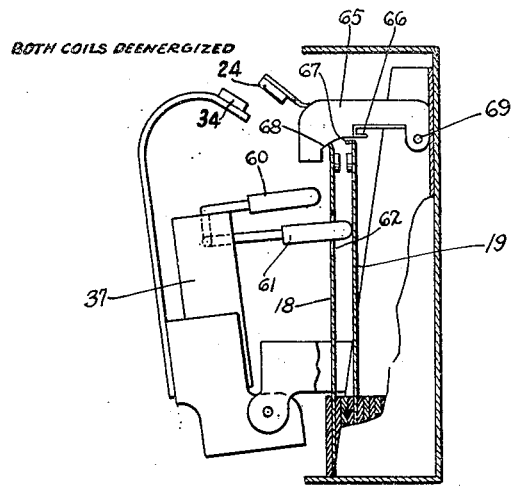
Fig.4    Fig.5
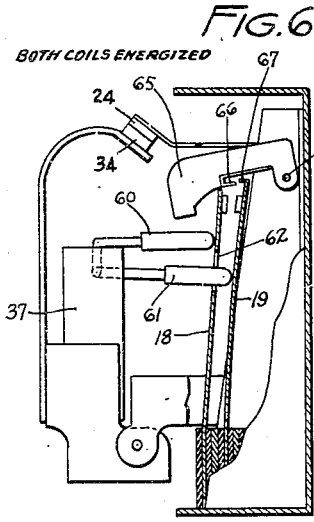 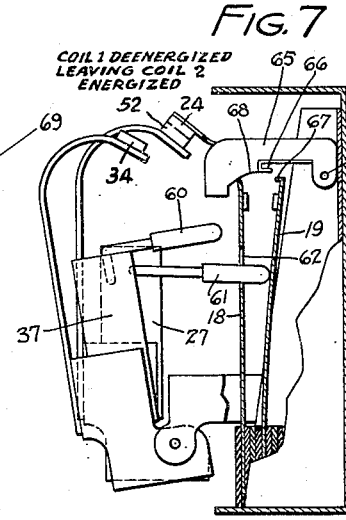 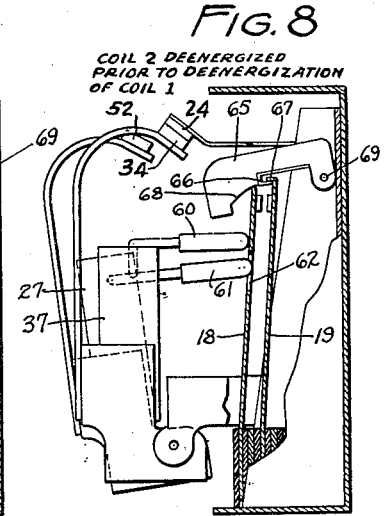
Fig.6   Fig.7   Fig.8
Inventor
GEORGE D. BOWER
ATTORNEYS Patented Feb. 12, 1935

1,990,813

UNITED STATES PATENT OFFICE 1,990,813

HEAT REGULATING APPARATUS

George D. Bower, Columbia Heights, Minn., assignor to Minneapolis-Honeywell Regulator Company, Minneapolis, Minn., a corporation of Delaware Application June 7, 1929, Serial No. 369,128

8 Claims. (Cl. 158—28)

This invention relates to heat regulating mechanisms and is broadly directed to means for controlling a burner apparatus and/or ignition means therefor, by the cooling movement of a thermally operable switch control element, as distinguished from the heating movement of such an element.

In controlling heating apparatus it is desirable to provide some means for obtaining a timed trial ignition period, and if ignition is not obtainable during this period, to stop the operation of the apparatus. It is particularly desirable to provide an electrically operable timing device, in which the timing period cannot be varied by any fluctuation in line voltage.

Objects of the present invention are therefore to provide means for operating a burner apparatus and/or ignition means, to produce and continue production of flame; to provide a device which is responsive to flame and which will continue burner apparatus operation when flame is present; to provide an ignition timing device the operation of which can be controlled by a thermal switch so that the timing device is made operable upon a call for heat; to provide connections for causing initial energization of the timing device without causing operation of the burner apparatus while the thermal timing device is heating; and to provide means to discontinue heating of the thermal timing device and to utilize the cooling movement of this device to start operation of the burner apparatus and ignition means and to prevent further operation of the burner apparatus and ignition means if flame is not produced at the end of a predetermined period of time, as measured by the cooling movement of the thermal element of the timing device.

Features of the invention include all details of construction as well as combinations and subcombinations of the parts, along with means for interrupting heat to a thermally operable switch control element after this element has been heated to a predetermined degree; means for locking this heating element control means or switch in open position to prevent operation of the thermal timing element upon failure to produce flame after a predetermined period; means separately operable to condition an ignition means circuit for energization after closure of the burner motor circuit at the end of the heating period of the thermal control element; and means responsive to production of flame at the burner for closing a holding circuit for the burner motor circuit control means, which means includes two contacts one of which closes when cold to initiate operation of the burner and the other of which closes when sufficiently hot to maintain burner operation, after ignition.

Other features and advantages of the invention will appear in the description of the drawings forming a part of this application, and in said drawings Figure 1 is a wiring diagram illustrating the invention and showing the device in inoperative condition;

Figure 2 is a face view of the relay panel illustrating the timer circuit control switch and interlock therefor;

Figure 3 is a vertical section on line 3—3 of Figure 2;

Figure 4 is a vertical section diagrammatically illustrating the operation of the switch, and showing both relays open;

Figure 5 shows the position of the elements when relay No. 1 is closed;

Figure 6 shows the position of the elements when both relays are closed;

Figure 7 shows the position of the elements when relay No. 2 is closed and relay No. 1 open;

Figure 8 shows the position of the elements when relay No. 2 is open and relay No. 1 closed; and Figure 9 is a diagrammatic representation of a simplified application of the invention.

Any suitable power source is indicated at 3, in this case a transformer. The coil of a relay or equivalent magnetically operable device is indicated at 1, and the coil of a second relay is indicated at 2. For convenience, the relays will sometimes be spoken of as "first and second". A thermostatically operable device is generally indicated at 4. This device is in the nature of a switch responsive to flame at the burner, to close a contact and establish a holding circuit to maintain burner operation. As shown the device has two contacts, a cold contact C, which is closed when there is no flame, and a hot contact H, which closes as the result of production of flame.

A switch and interlock device is diagrammatically indicated at 6, and this switch has contacts 18 and 19 respectively controllable by a mechanism operated by coils 1 and 2. The interlock device, see Figures 2 to 8, is herein considered a switch with means for locking it in open position. The contacts 18—19 control passage of current to a warp switch or equivalent thermally operable switch control device, as means for timing, by a cooling movement, a trial ignition period.

The construction of the switch, and latch or interlock therefor, is illustrated in Figures 2 to 8. The function of this device is to control current to the timer, and to latch in open position so that the timer can no longer receive current and therefore so that its operation can no longer be initiated in case coil 2 which controls the burner motor and ignition, is de-energized while coil 1 is energized. This de-energization corresponds to flame failure during ignition period and it is desired herein to prevent further operation of the device after such a failure. It will be understood that the object is to prevent operation of the burner motor after ignition failure, until the device has been inspected and repaired. Although the interlock device is an important feature of the invention, and although the switch and its relation to the burner motor, burner and ignition means for the burner plays an important part, the use of the cooling movement of the timer or warp switch as a measure of the trial ignition period (rather than the heating movement) is also an important feature. In all previous devices of this class known to me the heating movement is utilized for timing ignition, which is objectionable because it depends on electrical control. It is understood of course that the thermal element must be initially heated in order to utilize the cooling movement as means for timing the ignition period.

The heating coil of the timer is indicated at 7, and the bimetallic or thermal element 8, in this instance has been assumed to act as the conducting portion of a switch, but it will be understood that its movement is employed for controlling a switch or switches.

A thermostatic device, located in the room to control the supply of heat, has the element R and two contacts respectively B—W. Main lines are indicated respectively at 10—11.

A burner and burner motor are diagrammatically indicated at 12, and an ignition device for the burner is suggested at 13, the numeral 12$^a$ indicates the blower and 12$^b$ indicates the fuel pump. Any electrically operable type of burner may be employed. The thermostatic device including elements R—B—W, has holding contacts 24, 36 in circuit therewith controlled to close on energization of coil 1, and to open automatically on de-energization. Coil 1 also controls a contact 46, which closes when it is energized, to close the power line for the ignition means, for energization on closure of another contact 41 which is controlled by coil 2. The numerals 1 and 2 may, for convenience, be considered to refer to respective relays as a whole, rather than to the coils.

A holding circuit for coil 2 is established by the flame responsive device 4, which has hot and cold contacts respectively designated H—C. This holding circuit is established by closure at H, if after energization of coil 2, flame is produced at the burner. The closure of the motor line as the result of energization of coil 2, results in energization of the burner motor and ignition means, the ignition means control switch having been closed on energization of coil 1.

The source 3 is connected by conductors 15—16 with R of the room thermostat, and by conductor 17 with spring contact 18 of the interlock device 6. The other spring contact 19 of the interlock device is connected by conductor 20 with one terminal of the heating coil 7 of the ignition timer. The other terminal of the timer coil 7 is connected by conductor 22 with coils 2—1 and with secondary of transformer 3. When contacts 18—19 are closed, (as they are on energization of coil 1) coil 7 is energized, to start the timer.

The opposite side of coil 1 is connected by conductor 23 with contact 24 controlled by relay coil 1, and also with cold contact C of the thermostatic flame responsive device 4. The thermally controlled element of this device is indicated at 25, and the hot contact is indicated at H. The hot contact is connected by conductor 26 with switch 27, cooperative with contact 28, which contact is connected with coil 2 and with contact 29 by conductor 30. H, 27, 28 and 2 are also in circuit by conductor 26 with contact 31. Contacts 29—31, as well as another contact 32, are successively engageable by the element 8 as a warp switch or as a conducting element operable by a warp switch, or equivalent thermally operable device, during a preliminary heating movement of the element 8, to close holding circuits for coils 1 and 2 and to condition other circuits to be subsequently operated, to give a trial ignition period which is controlled by the cooling movement of the element 8, as distinguished from the heating movement.

Contact 32 is connected by conductor 33 with switch 34 cooperative with contact 24. Contact B of the room thermostat is connected by means of conductor 35 with element 25 and contact 36. Contact 36 is engageable by switch 37 in turn connected by conductor 38 with contact W. Elements 35, 36, 37, 38 provide a circuit through W, R, when R no longer engages B. Main line 11 is connected by conductor 40 with contact 41. Switch 42 cooperates with contact 41 and is connected by conductor 44 with switch arm 45, which arm is cooperable with contact 46. Contact 46 is connected by conductor 43 with ignition means 13, the ignition means being connected to line 10 by means of conductor 50. Line 10 is connected by conductor 51 with burner motor 12, and the burner motor 12 is connected on the opposite side by conductor 52 with conductor 44. When coil 2 is energized (which takes place after energization of coil 1 at or near the end of the heating movement of the timer), motor and ignition means are energized.

The timer control switch and latching means therefor, are illustrated in Figures 2 to 8. Referring first to Figure 2, the relay coils are shown at 1—2 and each has an armature which, for purposes of convenience, may be said to respectively correspond to elements 37 and 27 previously described as switch arms, see Figure 1. The essential part of the constructions illustrated in Figures 2 to 8 relate to the means operable by respective relay armatures for controlling contacts 18 and 19. Therefore no description will be directed to the specific construction of the device except for the elements essential to show the operation of the switches and the manner in which the latching device is conditioned for latching, and the manner in which it latches when No. 2 relay opens while No. 1 is closed, and so forth. It will be of course understood that when the coils 1 and 2 are energized the elements 37 and 27 will be correspondingly moved to close the contacts.

In this instance the armatures 37—27 are respectively provided with arms 60—61, respectively engageable with elements 18 and 19. That is, the element 60 controls element 18, while the element 61 controls element 19. Each of these switch control elements 60—61 is provided with an insulated tip, the numerals in Figures 4 to 8 having been applied to these insulated tips. The element 61 passes freely through an opening 62 in the switch element 18, to engage the element 19.

The latch element 65, see Figure 4, is suitably pivoted as at 69 and lies horizontally above the elements 18—19. This element operates by gravity. The numeral 66 indicates a hook or latch engageable with a corresponding latch 67 in the manner shown in Figure 8, when relay No. 2 opens, while relay No. 1 is closed. The under side of the latch is curved as at 68. When both relays are open, the outer and lower portion of this curved surface engages the upper end of the element 18. The relation of surface 68 to the upper end of the element 18 is such that the latch member is caused to assume various positions, according to the degree of rearward movement of the element 18 from its position shown in Figure 4.

Referring to Figure 4, which shows both relays open, it will be noted that the element 61 of the second relay is engaging the spring contact 19, and that the element 65 is held from downward movement by the upper end of the spring contact 18, and it will be further noted that the upper surface of the element 67 is spaced from the lower surface of the element 66 of the latch 65.

In Figure 5, relay No. 1 has been energized and element 60 has moved element 18 into contact with element 19 and both elements have been moved rearwardly. By this movement the latch 65 is released due to the rearward travel of the contact 18, and the further downward movement of element 65 is prevented by engagement of the bottom of element 66 with the top of element 67. This closed position of the switch corresponds to the initial energization of the coil 1 due to closing of the room thermostat, and as the result of this closing of the switch coil 7 receives current and the timer device begins to heat.

Referring now to Figure 6, the second relay has closed and it will be noted that the element 61 has engaged element 19 and opened the switch or, in other words, has separated the elements 18 and 19. By this movement the latch 65 has again moved downwardly and is supported by the upper end of the element 18. The latching element 66 has been brought to a level below the latching element 67 and the parts are thus conditioned, so that if relay No. 2 opens while relay No. 1 maintains its position, see Figure 8, element 19 is released and moves to locked position with the elements 18 and 19 separated so that no current can flow to the heating coil 7. This condition, shown in Figure 8, occurs when for any reason there is flame or ignition failure during a normal ignition period of the apparatus, that is when the burner is operating and fuel is being delivered, and the ignition means is being supplied with current. The contact 19 can only be released by a manual operation of relay armature No. 2, because at this time coil 2 cannot be electrically energized to move the armature. Release of contacts 18, 19 from the locked open position should only be made after inspection and repair or adjustment of the apparatus.

Figure 7 shows a condition where relay No. 1 has opened while relay No. 2 is closed. The position of element 18 corresponds to its position in Figure 4 in which its upper end is supporting the latch 65 in such position that the element 19 when released by the opening of the second relay, can again assume the position shown in Figure 4. The operation of the interlock will be again referred to in the description of the general operation.

Operation

The operation of the device is as follows: Suppose the element R to cool and move in direction of the arrow and close contacts B—W, contact W closing prior to contact B. Coil 1 is energized through the following circuit: 3, 15, 16, R, B, 35, 25, C, 23, 1, 22 to 3. As the result of energization of coil 1, three switches are closed to wit 34, 45, and 37. The closure of switch 37 establishes a holding circuit for coil 1 through W—R after B opens, which holding circuit is as follows: 3, 22, 1, 23, C, 35, W, R, 16, 15 to 3. The closure of 45 conditions the ignition circuit for energization, which energization is completed by energization of coil 2 and closure of 42, 41. The closure of 34 conditions a holding circuit through coil 1 and contact 32 which will open on the cooling cycle of the timer. At this stage it will be noticed that element 25 is cold and is making a contact C, because there is no flame at the burner. Elements 25, C constitute a part of the circuit through which coil 1 is initially energized. It will also be noticed that on energization of coil 1 contacts 18 and 19 are closed, see Figure 5, thus establishing a circuit through the heating coil 7 of the timer as follows: 3, 15, 17, 18, 19, 20, 7, 22 to 3. Thus upon energization of coil 1 as the result of a call for heat by the room thermostat, the warp switch heating coil is energized and deflection of the element 8 begins, successively closing contacts 32, 31, 29. Until 29 closes, neither motor nor ignition means are energized.

The flame responsive device has two contacts, one of which is always closed when the burner is inoperative, to condition the circuit to coil 1 for energization when the room thermostat closes, or in other words when sufficiently cold one contact controls energization of one of the relays, and the other contact controls a holding circuit for relay coil 2, which if broken on a cooling cycle of the timer, before the second contact of said flame responsive device closes will result in a shut-down of the apparatus. In other words, the function of this thermal flame responsive device is to close the circuit to the first relay when sufficiently cold, and to, under certain conditions, maintain energization of the second relay, when sufficiently hot.

The first action of the thermal element 8 of the timer, when heating, is to make contact at 32 to establish a holding circuit for coil 1 through B—W as follows: 3, 22, 1, 23, 24, 34, 33, 32, 8, 35, B, R, 16, 15 to 3, and from 35 through 36, 37, 38 to W, after B opens.

Deflection of the thermal element continues and contact is eventually made at 31. The result is the conditioning of a holding or controlling circuit for coil 2 through B, W, R, after element 25 breaks contact at C, as a result of flame production. This holding circuit is as follows: 3, 22, 2, 28, 27, 26, 31, 8, 35, B, R, 16, 15 to 3, and from 35 through 36, 37, 38 to W, and after relay No. 2 closes from 35 through 53, 52, 38 to W. Continued heating of the warp element 8 causes closure at 29, which results in energization of coil 2 through the following circuit: 3, 22, 2, 30, 29, 8, 35, B, R, 16, 15, 3 and from 35 through 36, 37, 28 to W. On energization of coil 2 the circuit is completed to the burner and ignition means as follows: 11, 40, 41, 42, 44, 52, 12, 51, to 10 and from 44 to 45, 46, 43, 13, 50 to 10. When contacts 27, 28 close the holding circuit for coil 2 is also established through 31, 8 and room thermostat elements R, B, W, as previously described.

The energization of coil 2 also results in opening of contact elements 18—19, see Figure 6, thus interrupting current to the heating element 7, and conditioning the contacts to be locked in open position, if coil 2 is de-energized while coil 1 is energized, which indicates ignition failure, or absence of flame.

The element 8 now cools and the trial ignition period begins, being entirely controlled by the cooling motion of the thermal element 8 or equivalent switch operating element. On cooling, contact is first broken at 29, but coil 2 remains energized through the holding circuit as follows: 3, 22, 2, 28, 27, 26, 31, 8, 35, B, R, 16, 15 to 3 or from 8 to 35, 36, 37, 38, W, 16, 15 to 3, or from 8 to 35, 53, 52, 38, W, R, 16, 15 to 3.

One function of the thermally operable ignition timing device is to heat, and successively close, first a holding circuit for the first relay, then close a holding circuit for the second relay, then close a circuit to energize the second relay (resulting in interruption of supply of heat to the timing device); then cool, and successively open the circuits in reverse order, the interval between the opening of the first and second contacts in this reverse order, being the measure of the trial ignition period.

If ignition is unsuccessful element 25 remains at C because no flame is produced, and contact 31 is broken, resulting in de-energization of coil 2, and opening of the motor and ignition circuits. Under these conditions contacts 18 and 19 are locked in open position, see Figure 8, so that coil 7 cannot receive heat, and therefore so that no starting cycle can be initiated. Inspection and repair are now in order. The apparatus cannot be operated or restarted until after manual release of the locked contacts 18 and 19 by moving relay armature 27 inwardly from its position in Figure 8. This release should not take place until after repair or adjustment.

If ignition is successful 25 will make contact at H before contact 31 opens. Under these conditions energization of coil 1 is maintained through the following circuit: 3, 22, 1, 23, 24, 34, 33, 32, 8, 35, B, R, 16, 15 to 3 or from 8 to 35, 36, 37, 38, W, R, 16, 15 to 3. Coil 2 is maintained energized by the following circuit: 3, 22, 2, 28, 27, 26, H, 25, 35, B, R, 16, 15 to 3 or from 35 to 53, 52, 38, W, R, 16, 15 to 3. However, 8 continues to cool and 32 is opened thus de-energizing coil 1 and opening the ignition circuit, coil 2 remaining energized to maintain burner operation.

The normal burner operation is now taking place. As soon as sufficient heat has been delivered to the room to cause element R to leave both elements B, W, coil 2 will be de-energized, and the burner motor circuit opened. The device is now conditioned for recycling to obtain trial ignition and flame, when R again contacts B—W as the result of having cooled sufficiently.

The present device therefore provides, among other features, a first relay (coil 1) or equivalent magnetically operable switch control device, which is energized when a device 4 responsive to production of flame at the burner is sufficiently cold (closed at C), and in some instances when a thermal switch closes. When the first relay closes, a circuit to a thermally operable ignition timing device is also closed and heat is supplied, to a thermally operable switch control element, 7.

Moreover, there is a second relay (coil 2) or equivalent magnetically operable switch control device, which controls the burner motor and/or ignition circuits, or burner apparatus, 12. A portion of this ignition circuit is also controlled by the first relay so that ignition can be discontinued after flame is produced, the second relay acting to continue burner motor operation after ignition is discontinued. The second relay is caused to close when the thermal element 8, of the trial ignition timing device has been heated in a predetermined degree, and the closing of this second relay opens the circuit to the timing device so that heat is no longer supplied, and so that thereafter the thermally operable switch control element 8, is allowed to cool. A portion of the time required for this element to cool is utilized, as a measure of the trial ignition period. This is a valuable feature of the invention, because the trial ignition period does not depend upon a balanced electrical condition, and is therefore independent of line voltage fluctuation. The temperature of the cooling timer control element falls at an even and dependable rate.

In order that both relays (coils 1 and 2) remain energized with their contacts 41, 46 closed to operate the motor and supply ignition during the trial ignition period, the thermal element of the timing device when being heated, successively closes two holding contacts, 32, 31, one for the first, and one for the second relay, and finally closes a third contact 29, which causes energization of the second relay, this energization taking place when the thermal element of the timer has reached a predetermined higher temperature.

The energization of the second relay results in opening of the supply circuit to the thermal element of the timer, and this element begins to cool. In cooling that contact 29, which closed to energize the second relay is first to open. However, the relay is held closed through the holding circuit which was established during the heating movement of the thermal element. The interval required for a certain degree of cooling of the thermal control element after opening of the contact which caused energization of the second relay, and until the holding contact 31, for the second relay is opened as the result of continued cooling, is the measure of trial ignition period. If the holding contact 31, for the second relay opens before the flame responsive device closes its circuit in response to production of flame at the burner, the switch or contact (18, 19) controlling heat to the timing device, will be mechanically locked in open position, the second relay will be immediately de-energized, and the first relay will be de-energized upon further cooling movement of the thermal switch. It will be noted that the closing movement of the second relay causes an opening of the circuit to the thermal control element of the timing device, so that no further heating can take place, and therefore no re-energization of the second relay can take place, if the second relay is opened while the first relay is closed, see Figure 8.

If however the flame responsive device 4 closes its contact H to establish a holding circuit for the second relay in response to production of flame at the burner, before holding contact 31 for the second relay opens, both relays will remain energized, and the burner motor will operate as well as the ignition means, until by further cooling of the thermal element of the timer, contact 32 of the first relay is opened, to interrupt the circuit to the ignition means.

If there is a momentary power failure while the room thermostat (R, B, W) is closed, after the thermal element 8 has fully cooled, see Figure 7, the element 61 operable by the second relay will be moved to the position shown in Figure 4, and when the element 25 as the result of absence of flame cools and makes contact at C, relay 1 will be again energized through the circuit previously described, (which is the starting circuit for this relay), contacts 18 and 19 will be brought together as shown in Figure 5, element 7 will receive heat and a trial ignition period will be reinitiated, at the end of which period, if flame is not forthcoming the elements 18—19 will assume the position shown in Figure 8, and be locked open, to discontinue heat to the coil 7, and leave the apparatus in inoperative position, so that it can only be started by manual manipulation.

It will be noted that the switch including the elements 18—19 has means for latching these elements in open position, and that the closing of these contacts is controlled by the first relay, and their openings by the second relay. It will be further noted that after the second relay closes the elements 66—67, see Figure 6, are positioned to lock, if while relay No. 1 is closed relay No. 2 opens, see Figure 8.

The device herein therefore provides means whereby on failure of ignition the entire apparatus is rendered inoperative, and the device is locked and certain circuits are locked in open position so that no further operation can be had until after inspection and repair. Moreover, the device utilizes the cooling motion of a warp switch or equivalent device, rather than the heating motion for timing an ignition period.

In the form of the invention shown in Figure 1, re-cycling will occur if combustion or flame fails after successful ignition has been established. Under normal operating conditions, if the flame should fail, 25 will move away from H, causing de-energization of coil 2 whereupon the parts will return to the position shown in the figure with the interlock switch open, but the room thermostat closed. An attempt will then be made to establish combustion and if combustion is successful, the system will operate in the usual manner. If combustion is not successful, the interlock switch will be locked in open position in the same manner as if the system were starting as the result of a call for heat by the room thermostat.

Figure 9 illustrates a simplified circuit in which the principles of this invention are embodied and in which a single relay or equivalent device only is employed, and which illustrates an important function of the device, towit: that in case of flame failure during normal operation of the apparatus, the burner apparatus as well as fuel supply is immediately rendered inoperative. Moreover, the device remains inoperative a sufficient length of time to permit dissipation of any accumulation of explosive vapors. Therefore, upon opening of a flame controlled switch, the whole burner apparatus, including fuel supply, is shut down and remains shut down for a predetermined period, during which any unsafe accumulation of explosive vapors are dissipated by the natural draft of the furnace.

Numeral 80 represents the motor of the burner apparatus, 81 the blower, 82 the fuel pump, 83 the fuel supply pipe delivering into the blower. Numeral 82 merely represents one means for stopping fuel delivery when the burner apparatus stops. Other means may be used. There is no intention to be limited to a mechanical connection between motor and fuel pump. The ignition is indicated at 79 and may be controlled in any suitable manner. The burner motor is controlled by a switch 86 connected on one side by line 84 to one terminal of the motor. This switch operates against contact 87 which is connected by line 85 with the one side of a power line, the supply source of which is not shown. The opposite side of the power line 78 is connected with the opposite terminal of the motor.

A relay or equivalent electrically-controllable switch device includes a coil 102, armature 91 herein shown as a current-carrier, operating against contact 92. In this embodiment of the invention, the switch is open when the room thermostat R—B—W is open. A second switch armature 89 operating against contact 90 is mechanically connected by element 78. This switch controls a portion of the starting circuit, of which the heating element 95 is a part. Element 78 also connects the motor control switch element 86, so that on energization of coil 102 elements 91, 89, and 86 are moved substantially in unison, and holding switch 91 and motor switch 86 are closed, while starting switch 89 is opened.

A timing device is also provided which is thermally operable and includes a heating coil 95 and a bimetallic element 106 (here, for convenience, shown as a current-carrier) arranged to bend in the direction indicated by the arrow when the circuit is closed to the heating coil 95. This element 106 closes a circuit through contacts 105 and 114. A device 109 is responsive to heat produced by the burner apparatus and has the contacts 110 and 111 which close when heat is supplied, or when flame is present. A room thermostat includes the elements R, B, W. A source of power is indicated at 100.

For the sake of brevity the wiring connections will not at this time be referred to by numeral but will be so referred to when the circuits are traced during explanation of the operation. However, there are a number of points to be noted at this time, towit: that the room thermostat controls power to the heating coil 95; that the starting circuit is through the room thermostat and heating coil; that this starting circuit is broken on energization of the relay coil 102; and therefore supply of heat to the coil 95 is discontinued at this time; that the circuit through the coil 102 is closed when the timing element 106 is sufficiently hot; and that the circuit through relay coil 102 will be broken when device 106 is sufficiently cool, if flame is not produced at the burner during the trial ignition period.

*Operation*

The operation of the device of Figure 9 is as follows: Suppose a call for heat at the room thermostat sufficient to close the contacts B—W. The heating coil is energized through the following circuit: 100, 98, 99, W, R, B, 94, 95, 96, 90, 89, 103, 101 to 100. At the end of about one minute, the element 106 closes contacts 114—105, and as the result the relay coil 102 is energized through the following circuit: 100, 101, 102, 115, 113, 114, 106, 105, 97, 98 to 100. The result is closure of contacts 91—92 and 86—87, and opening of contacts 89—90. The opening of the latter contact opens the circuit to the heating coil, which is a part of the starting circuit. The element 106 will now cool and eventually open contacts 105, 114. The closing of contacts 91—92 conditions a holding circuit for coil 102, for closing, which closing is completed by closing of contacts 110—111 in response to production of heat at the burner. In case flame is produced at the burner apparatus, before element 106 cools sufficiently to open 105—114, contacts 110—111 close and this holding circuit is completed, and 102 remains energized after 106 has cooled and broken contact at 105—114. If contacts 105—114 are broken before contacts 110—111 close, coil 102 is de-energized and the apparatus assumes the position shown in full lines in Figure 9, and motor and fuel are stopped. On the other hand, if contact is made at 110—111 before contact is broken at 105—114 the apparatus remains in normal running operation through circuit: 100, 98, 99, W, R, 93, 92, 91, 108, 110, 111, 112, 115, 102, 101 to 100. As long as R maintains the contact with W the burner apparatus will be normally operating, unless, of course, there is flame failure, or power failure. When contact is broken at R—W, 102 is de-energized and the motor is stopped. Not only is the motor stopped but the fuel supply is stopped, because in this instance, there is a mechanical (shaft) connection between the motor 80 and the fuel pump 82. This is a valuable feature of the invention because on flame failure and on opening of contacts 110—111 the complete burner apparatus will be shut down, no fuel will be delivered over a predetermined period of time required to heat element 106, close contacts 105—114 and obtain re-energization of relay 102 and a restart of the motor during which time explosive vapors will have been dissipated.

I claim as my invention:

1. A burner apparatus including a burner motor, ignition means for the burner, first and second relays, the first to control the ignition means and the second to control the motor, a switch controlled by both relays and operated to close when the first is energized and to open when the second is energized, a room thermostat, a flame responsive switch alternatively engageable with contacts and adapted to close one when flame is absent and to close the other when flame is present, a thermal switch which when sufficiently heated successively closes first, second and third contacts and while cooling successively opens said contacts in reverse order, means for heating the switch, a starting circuit for the first relay including said room thermostat and that contact of the flame responsive device which is closed in absence of flame; holding circuit for said first relay which includes said room thermostat, that contact of the thermal switch which is first to close, and a holding contact of said first relay; a starting circuit for the second relay which includes said room thermostat and that contact of the thermal switch which is last to close; a holding circuit for said second relay which includes said room thermostat; that contact of said thermal switch which is second to close, and a holding contact of said second relay; a second holding circuit for said second relay which includes said room thermostat, that contact of the flame responsive device which is closed on production of flame, and said holding contact of said second relay, and a control circuit for said heating means which includes the contact which is controlled by both relays.

2. A device of the class described, including a burner motor, ignition means, a room thermostat, a timing switch, and electrically operable motion effecting means therefor, a first relay to control ignition means operation, a second relay to control ignition means and burner motor operation, means controlled by both relays and including a switch which controls current to said timer switch motion effecting means, which switch is adapted to be closed on energization of the first relay, and is further adapted to be opened when the second relay is energized, and is further adapted to be locked in open position if the second relay is de-energized while the first is energized, and a device responsive to production of flame at the burner, to open a first switch and close a second switch; a circuit for said first relay including said room thermostat and said first switch of said flame responsive device; a first circuit for said second relay including said timer switch and said room thermostat; and a second circuit for said second relay including said second switch of said flame responsive device and said room thermostat.

3. A device of the class described, including a burner and a burner motor, ignition means, first and second relays, which first relay on energization closes a contact in the ignition means circuit, and which second relay on energization closes the motor circuit and completes the closure of the ignition means circuit, means responsive to production of flame at the burner which closes a contact to energize the first relay when flame is absent, and which closes a contact in a holding circuit for the second relay after production of flame and maintains such closure while flame is present, a thermal switch operable to close on heating and heating element therefor, a switch controlling current to said heating element and controlled by both relays, to be closed on energization of the first and to be opened on energization of the second, and to be opened and locked in open position if the second relay is de-energized while the first is energized, said thermal switch closing an energizing circuit for said second relay after being heated to a degree resulting in a predetermined movement thereof, and after the circuit to the heating element is broken operating to time an opening of the energizing circuit for the second relay resulting in a shut-down if the flame responsive means does not close its contact which is in said holding circuit of the second relay.

4. A burner apparatus including a burner motor, ignition means for the burner, first and second relays, the first to control the ignition means and the second to control the motor, a switch controlled by both relays and operated to close when the first is energized and to open when the second is energized and further to be locked in open position when the second relay is de-energized while the first is energized, a room thermostat, a flame responsive switch having means alternatively engageable with contacts to close one when flame is absent and to close the other when flame is present, a thermal switch which when sufficiently heated successively closes first, second and third contacts and while cooling successively opens said contacts in reverse order, means for heating the switch, a starting circuit for the first relay including said room thermostat and that contact of the flame responsive device which is closed in absence of flame; holding circuit for said first relay which includes said room thermostat, that contact of the thermal switch which is first to close, and a holding contact of said first relay; a starting circuit for the second relay which includes said room thermostat and that contact of the thermal switch which is last to close; a holding circuit for said second relay which includes said room thermostat; that contact of said thermal switch which is second to close, and a holding contact of said second relay; a second holding circuit for said second relay which includes said room thermostat, that contact of the flame responsive device which is closed on production of flame and said holding contact of said second relay, and a control circuit for said heating means which includes the contact which is controlled by both relays.

5. A control system of the class described for an electrically operated fuel control device and electrically operable ignition means, comprising, in combination, a first relay coil, a first normally open relay switch movable to closed position when said relay coil is energized, a second relay coil, a second normally open relay switch movable to closed position when said second relay coil is energized, a circuit for the fuel control device including only said second relay switch, a circuit for the ignition means including both of said relay switches, a main switch, a combustion switch which is opened in response to a cessation of combustion, a circuit for said first relay coil including said main switch, an energizing circuit for said second relay coil controlled by said first relay coil and main switch, whereby the relay coils will be energized in succession as a result of closure of said main switch, a holding circuit for the second relay coil controlled by the main switch and combustion responsive switch in series and means for subsequently de-energizing said first relay coil to open said first relay switch whereby the ignition means will be de-energized but energization of the fuel control means will be maintained.

6. A control system of the class described for an electrically operated fuel control device and an electrically operable ignition means, comprising a first relay coil, first and second normally open relay switches movable to closed position when the first relay coil is energized, a second relay coil, third and fourth normally open relay switches movable to closed position when said second relay coil is energized, a circuit for the ignition means controlled by the first and third relay switches, a circuit for the fuel control device including the third relay switch only, a main switch, a combustion responsive switching mechanism including a cold switch which is opened upon the establishment of combustion and a hot switch which is opened upon cessation of combustion, a circuit for the first relay coil dominated by the main switch and the cold switch of the combustion responsive switching mechanism, a circuit for the second relay coil including the main switch and second relay switch whereby initial energization of the second relay coil is dependent upon energization and operation of the first relay coil, and a holding circuit for the second relay coil including the main switch, hot switch of the combustion responsive switching mechanism and fourth relay switch but independent of the second relay switch, opening of said cold switch de-energizing the first relay coil, whereby the ignition means is de-energized but the fuel control device is maintained energized, if combustion is successfully established.

7. A control system of the class described for an electrically operated fuel control device and an electrically operable ignition means, comprising a first relay coil, first and second normally open relay switches movable to closed position when the first relay coil is energized, a second relay coil, third and fourth normally open relay switches movable to closed position when said second relay coil is energized, a circuit for the ignition means including the first relay switch, a circuit for the fuel control device including the third relay switch only, a main switch, an energizing circuit for the first relay coil dominated by the main switch, a circuit for the second relay coil including the main switch and second relay switch whereby initial energization of the second relay coil is dependent upon energization and operation of the first relay coil, a combustion switch which is opened in response to a cessation of combustion, a holding circuit for the second relay coil including the main switch, combustion switch and fourth relay switch but independent of the second relay switch and means for de-energizing the first relay coil subsequent to the energization of the second relay coil whereby the ignition means is de-energized but the fuel control device is maintained energized.

8. A control system for an electrically operated fuel control device and electrically operable ignition means, comprising, in combination, a first electromagnetic coil, a first load switch and first control switching means movable to closed position upon energization of said first electromagnetic coil, a second electromagnetic coil, a second load switch and second control switching means movable to closed position upon energization of said second electromagnetic coil, a circuit for the ignition means controlled by both of said load switches in series, a circuit for the fuel control device controlled by said second load switch only whereby said fuel control device will be energized upon energization of said second electromagnetic coil only but said ignition means will only be energized when both of said electromagnetic coils are energized, a room thermostat including a holding switch and a starting switch that are sequentially closed in the order named upon a lowering in room temperature, a combustion responsive switching mechanism including a hot switch which is opened upon cessation of combustion and a cold switch which is closed after opening of said hot switch upon cessation of combustion and is opened upon establishment of combustion, an energizing circuit for said first electromagnetic coil including said starting contact and cold contact in series, a holding circuit for said first electromagnetic coil including said holding switch, first control switching means and cold switch, an energizing circuit for said second electromagnetic coil including said holding switch and the first control switching means and a holding circuit for said second electromagnetic coil including said holding switch, second control switching means and hot switch.

GEORGE D. BOWER.